UNITED STATES PATENT OFFICE.

CARL POLLAK, OF FRANKFORT-ON-THE-MAIN, GERMANY.

PROCESS OF MANUFACTURING ELECTRODES.

SPECIFICATION forming part of Letters Patent No. 505,125, dated September 19, 1893.

Application filed April 19, 1893. Serial No. 470,993. (No specimens.)

*To all whom it may concern:*

Be it known that I, CARL POLLAK, a subject of the Emperor of Austria-Hungary residing at Frankfort-on-the-Main, Prussia, Germany, have invented certain new and useful Improvements in Processes of Manufacturing Electrodes, of which the following is a specification.

In order to effect the rapid formation of electrodes of the so called "Planté" kind, and to obtain greater reception power with small weight, I use porous compressed lead which I obtain by wet process through electrolysis in the following manner. Pulverized carbonate of lead is mixed with caustic soda or with caustic potash into a hard paste, and this is worked into the form of the electrodes to be produced.

To manufacture electrodes in the form of plates, sheets or disks of corresponding thickness are cut, which (when plates without cores are to be formed) are laid upon metal sheets or boards; for plates with cores, the sheets or disks are laid on one or both sides of the plates serving as cores (with smooth or roughened surfaces with or without projections perforated or braided) and pressed together, after which they are dried. After drying, the plates are set in an alkali solution of caustic soda, caustic potash, carbonate of soda or the like. Disks that are without metallic core are fastened to good conducting plates and are then set in the alkaline solution; the plates provided with metallic cores need not be fastened to other metallic plates. The reduction takes place, either by zinc plates being placed between the plates to be reduced and electrically connected with the same; or other separate suitable metallic plates are placed between and connected with the positive pole, the plates to be reduced with the negative pole, of an electric generator. After some time the carbonate of lead is reduced to metallic lead. In this condition it is, however, too porous for practical purposes; it is therefore compressed wet, whereupon a solid metallic lead is produced, which is rollable and workable under the hammer and shows a perfectly metallic brilliant cut. To the plates which are made without conducting core or with non-conducting core, other conducting strips are either soldered or otherwise brought into good contact, or smooth metallic plates are covered on both sides with plates of the porous lead. Pieces of this porous lead can also be provided with frames, or several pieces can be laid near to each other in a mold, and metal poured around them. Such plates are then placed in diluted sulphuric acid and supplied with the current, and indeed in both directions in cases where the maximum capacity is to be quickly reached. The peroxide of lead formed from this lead by the current does not crumble, it is therefore not necessary to mechanically hold fast the same by specially constructed grating or lattice work. The color of such positive plates in a charged condition is black.

Having described my invention, what I claim as new, and desire to secure by Letters Patent, is—

The process of producing electrodes for electrical accumulators which consists in mixing pulverized carbonate of lead with caustic soda or caustic potash so as to form a paste, then forming the same into suitable shape or form, then drying the same, then placing the same in an alkaline bath and applying an electric current to reduce the carbonate of lead to metallic lead, and then compressing the same while still in a wet state, substantially as described.

In testimony whereof I have signed my name to this specification in the presence of two subscribing witnesses.

CARL POLLAK.

Witnesses:
N. MAPORBACH,
R. HANACRIKY.